US012670552B2

(12) United States Patent
Huang et al.

(10) Patent No.: US 12,670,552 B2
(45) Date of Patent: Jun. 30, 2026

(54) IMAGE CALIBRATION METHOD AND RELATED IMAGE CALIBRATION DEVICE

(71) Applicant: MEDIATEK INC., Hsin-Chu (TW)

(72) Inventors: Yu-Hua Huang, Hsinchu City (TW);
Pin-Wei Chen, Hsinchu City (TW);
Keh-Tsong Li, Hsinchu City (TW);
Shao-Yang Wang, Hsinchu City (TW);
Chia-Hui Kuo, Hsinchu City (TW);
Hung-Chih Ko, Hsinchu City (TW);
Yun-I Chou, Hsinchu City (TW);
Yen-Yang Chou, Hsinchu City (TW);
Chien-Ho Yu, Hsinchu City (TW);
Chi-Cheng Ju, Hsinchu City (TW);
Ying-Jui Chen, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 99 days.

(21) Appl. No.: 18/402,697

(22) Filed: Jan. 2, 2024

(65) Prior Publication Data

US 2024/0273675 A1     Aug. 15, 2024

Related U.S. Application Data

(60) Provisional application No. 63/444,235, filed on Feb. 9, 2023.

(51) Int. Cl.
| | |
|---|---|
| *G06T 5/50* | (2006.01) |
| *G06T 5/73* | (2024.01) |
| *G06T 7/33* | (2017.01) |
| *H04N 5/265* | (2006.01) |
| *H04N 23/741* | (2023.01) |

(52) U.S. Cl.
CPC .................. *G06T 5/50* (2013.01); *G06T 5/73* (2024.01); *G06T 7/337* (2017.01); *H04N 5/265* (2013.01); *H04N 23/741* (2023.01); *G06T 2207/10024* (2013.01); *G06T 2207/10048* (2013.01); *G06T 2207/20201* (2013.01); *G06T 2207/20208* (2013.01); *G06T 2207/20221* (2013.01); *G06T 2207/30232* (2013.01)

(58) Field of Classification Search
CPC ........ H04N 5/265; H04N 23/741; G06T 5/50; G06T 5/73; G06T 7/337; G06T 2207/10024; G06T 2207/10048; G06T 2207/20201; G06T 2207/20208; G06T 2207/20221; G06T 2207/30232
See application file for complete search history.

(56) References Cited

U.S. PATENT DOCUMENTS

| | | | | |
|---|---|---|---|---|
| 10,863,105 | B1 * | 12/2020 | Rosengaus | ............. G06V 10/60 |
| 2008/0219585 | A1 * | 9/2008 | Kasai | ..................... H04N 23/71 382/274 |

(Continued)

*Primary Examiner* — Kelly L Jerabek
(74) *Attorney, Agent, or Firm* — Winston Hsu

(57) ABSTRACT

An image calibration method is applied to an image calibration device includes an image receiver and an operation processor. The image calibration method of providing a motion deblur function includes driving a first camera to capture a first image having a first exposure time, driving a second camera disposed adjacent to the first camera to capture a second image having a second exposure time different from and at least partly overlapped with the first exposure time, and fusing a first feature of the first image and a second feature of the second image to generate a fusion image.

12 Claims, 10 Drawing Sheets

(56) References Cited

U.S. PATENT DOCUMENTS

| | | | |
|---|---|---|---|
| 2014/0139642 A1* | 5/2014 | Ni | H04N 23/13 |
| | | | 382/162 |
| 2016/0309133 A1* | 10/2016 | Laroia | H04N 23/90 |
| 2018/0071854 A1* | 3/2018 | Matthews | A42B 3/225 |
| 2020/0294214 A1* | 9/2020 | Numata | H04N 23/95 |
| 2020/0374461 A1* | 11/2020 | Hubel | H04N 23/951 |
| 2021/0218871 A1* | 7/2021 | Peng | H04N 23/45 |
| 2023/0014272 A1* | 1/2023 | Shao | H04N 23/951 |
| 2024/0155248 A1* | 5/2024 | Shen | H04N 23/73 |

\* cited by examiner

IMAGE CALIBRATION METHOD AND RELATED IMAGE CALIBRATION DEVICE

CROSS REFERENCE TO RELATED APPLICATIONS

This application claims the benefit of U.S. Provisional Application No. 63/444,235, filed on Feb. 9, 2023. The content of the application is incorporated herein by reference.

BACKGROUND

High dynamic range (HDR) technology is widely used as time goes on, which allows the image or the video to gather more information, but the conventional HDR image/video may usually have a motion artifact phenomenon. For example, the conventional HDR technology uses the single camera to successively capture several images with different exposure times, and then fuses the images into the HDR image/video. However, the HDR image generated by the conventional HDR technology usually causes the motion artifacts due to the motion area varies in the images having different exposure times and being captured at different time stamp through the single camera.

SUMMARY

The present invention provides an image calibration method of having more image details and providing a motion deblur function and a related image calibration device for solving above drawbacks.

According to the claimed invention, an image calibration method of providing a motion deblur function includes driving a first camera to capture a first image having a first exposure time, driving a second camera disposed adjacent to the first camera to capture a second image having a second exposure time different from and at least partly overlapped with the first exposure time, and fusing a first feature of the first image and a second feature of the second image to generate a fusion image.

According to the claimed invention, an image calibration device includes an image receiver and an operation processor. The image receiver is adapted to receive a first image captured by a first camera and a second image captured by a second camera. The operation processor is electrically connected to the image receiver. The operation processor outputs a control command for driving the first camera to capture the first image having a first exposure time and driving the second camera to capture the second image having a second exposure time different from and at least partly overlapped with the first exposure time, and further receives the first image and the second image via the image receiver so as to fuse a first feature of the first image and a second feature of the second image to generate a fusion image.

The image calibration method and the image calibration device can utilize the multiple cameras to capture the image with frame synchronized and the at least partly overlapped exposure times; because the images captured by different cameras can be captured at the same starting point of time, or be captured at the same ending point of time, or have the completely or partly overlapped exposure times, the multiple frame-sync and viewpoint-align images can be fused into the single HDR image without the motion artifacts.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
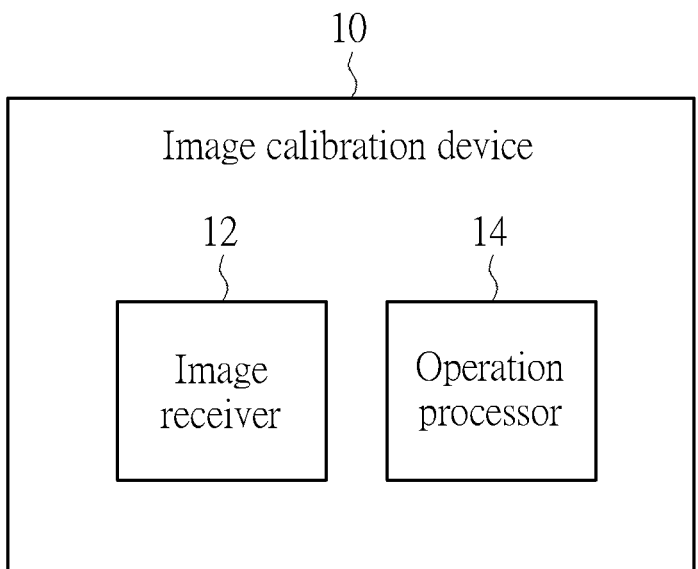
FIG. 1 is a functional diagram of an image calibration device according to an embodiment of the present invention.

Please refer to FIG. 1. FIG. 1 is a functional diagram of an image calibration device 10 according to an embodiment of the present invention. The image calibration device 10 can be applied for a surveillance camera or an image capturing apparatus that has at least two cameras. Images captured by the at least two cameras can have different exposure times that are at least partly overlapped with each other. The image calibration device 10 can generate a high dynamic range (HDR) image or a HDR video by controlling the exposure times of the at least two cameras, so as to provide a motion deblur function and avoid motion artifacts from the HDR image/video.

The image calibration device 10 can include an image receiver 12 and an operation processor 14 electrically connected to each other. The image receiver 12 can be communicated with the at least two cameras (or called two image sensors) in a wired manner or in a wireless manner. The operation processor 14 can output a control command to drive the at least two cameras to capture multiple images with different exposure times. The multiple images may be captured and synchronized at the same starting point of time or at the same ending point of time. Moving objects within the multiple images are varied during an overlapped period of the different exposure times, and the motion artifacts can be effectively eliminated to provide the HDR image/video with great quality.

Figure 2:
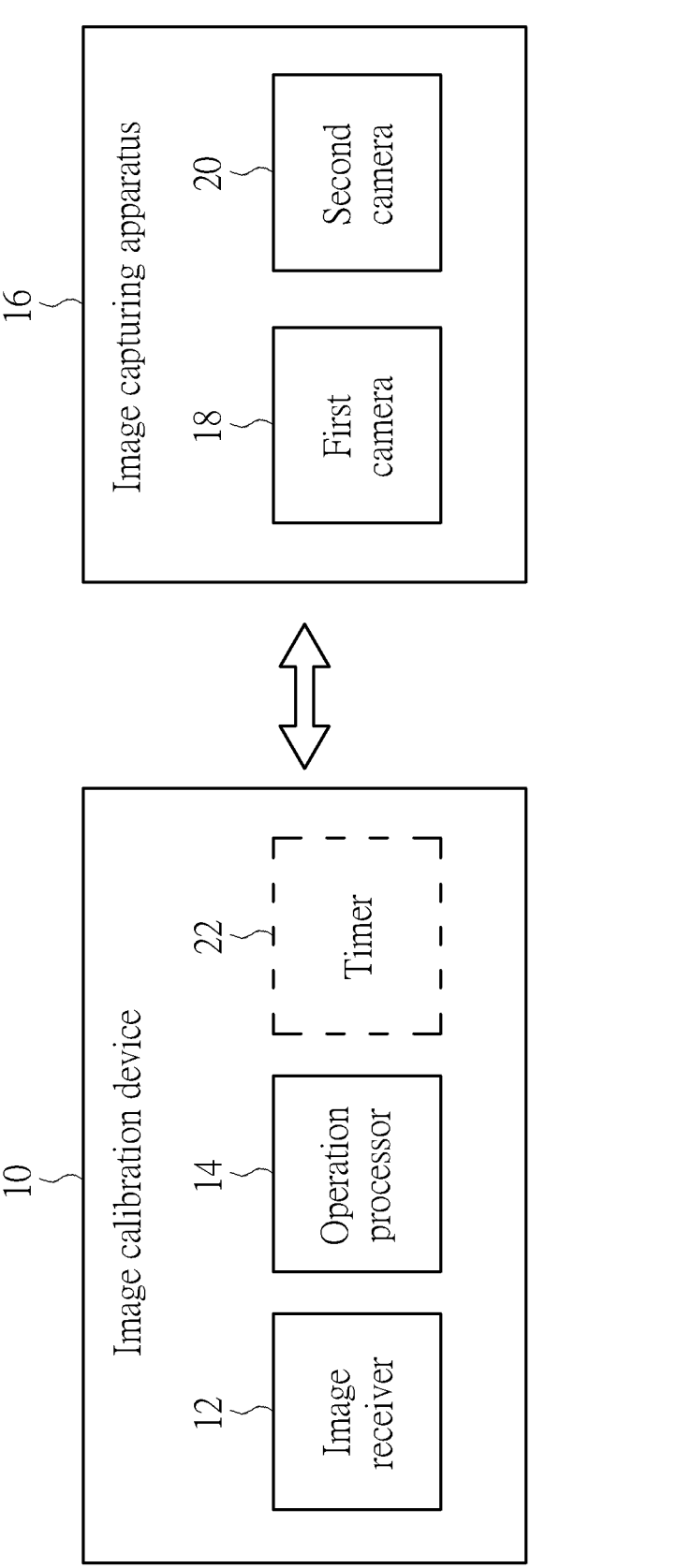
FIG. 2 is a functional diagram of the image calibration device and a related image capturing apparatus according to a first embodiment of the present invention.
Figure 3:
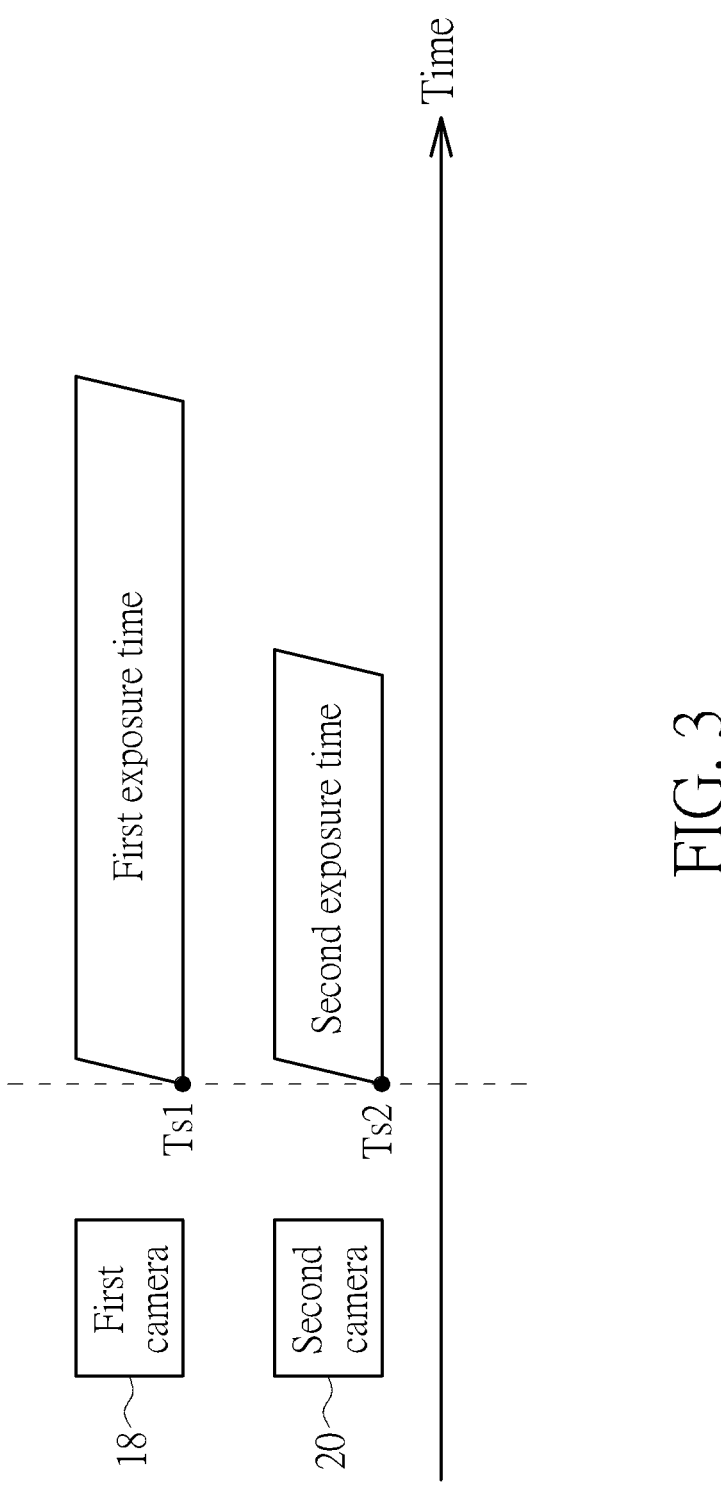
FIG. 3 to FIG. 5 are diagrams of difference in the exposure times of the multiple images according to different embodiments of the present invention.
Figure 4:
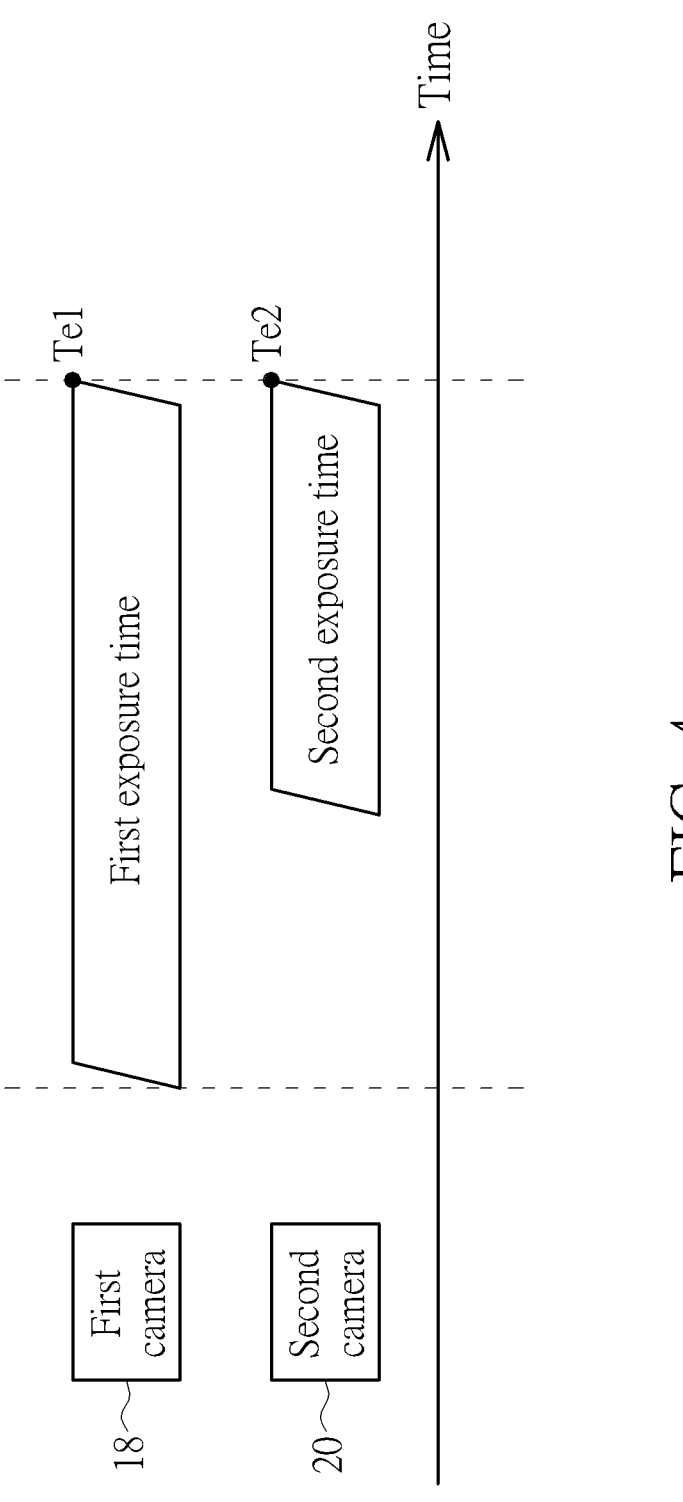
Figure 5:
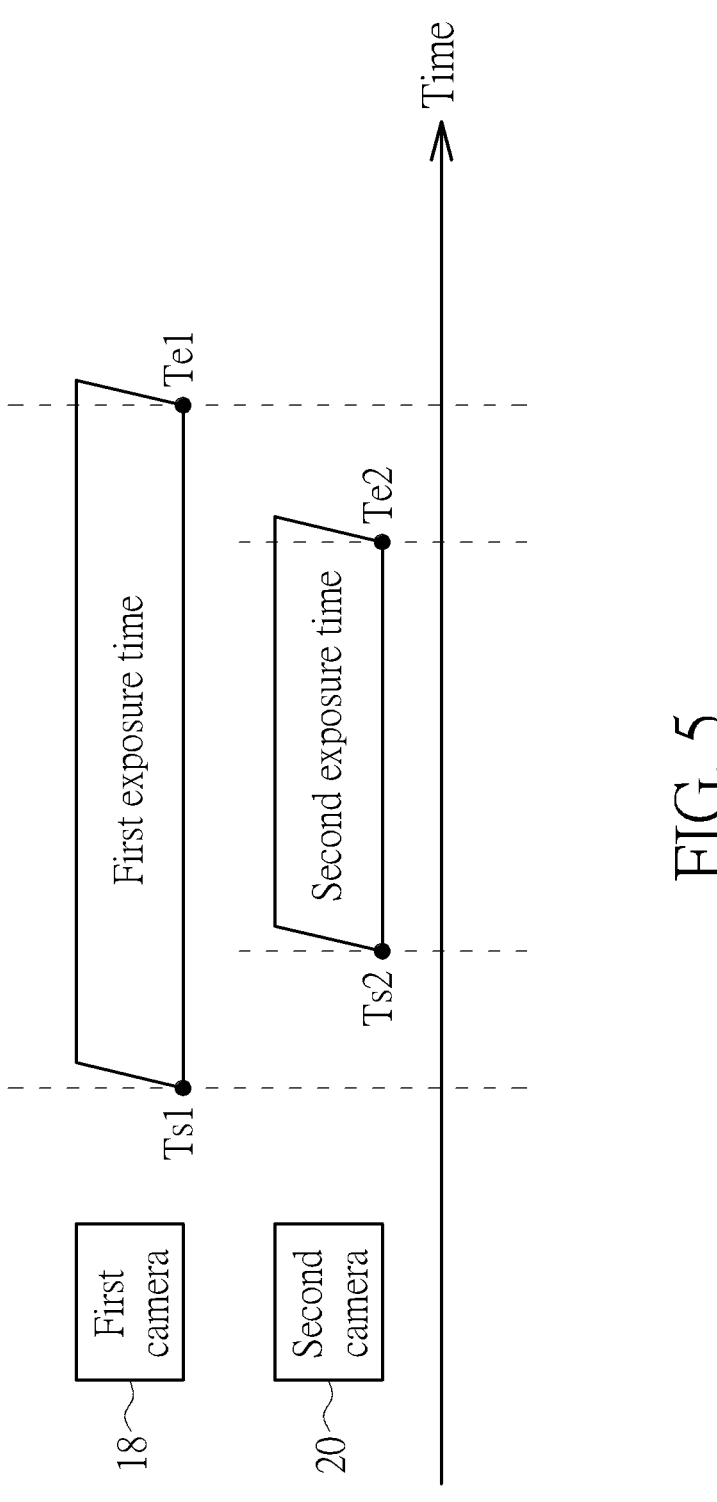
Figure 6:
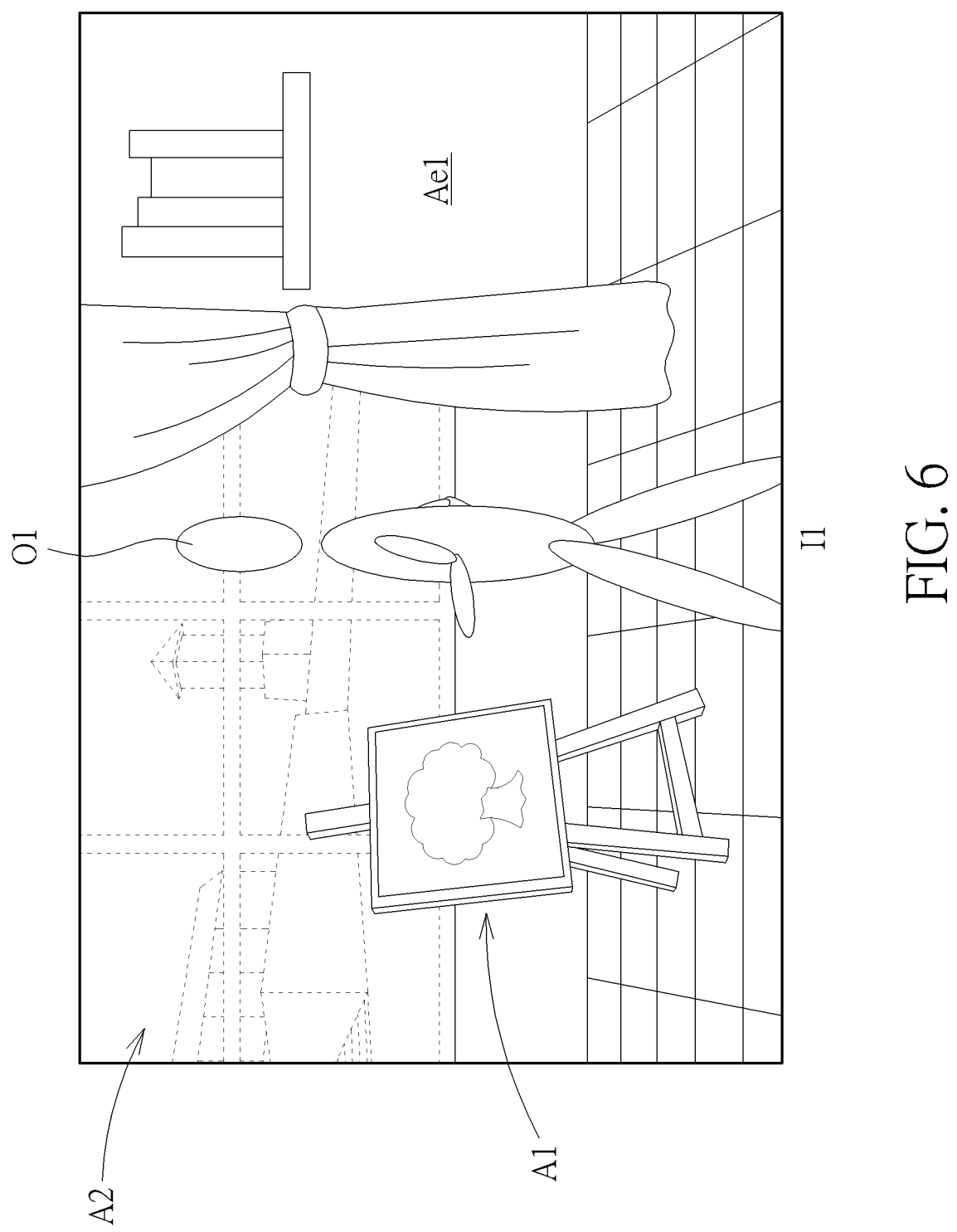
FIG. 6 is a diagram of an image having a long exposure time according to the first embodiment of the present invention.
Figure 7:
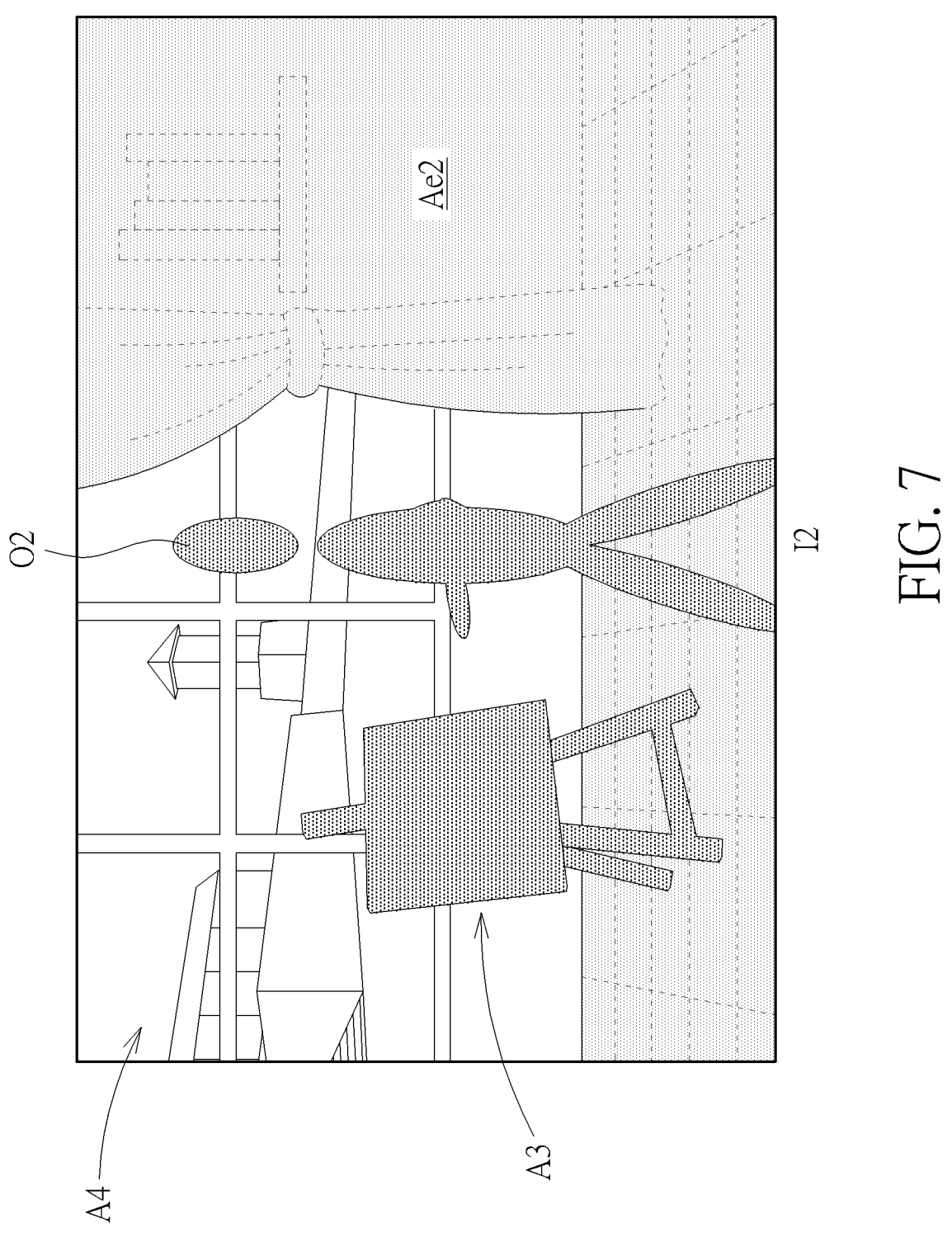
FIG. 7 is a diagram of an image having a short exposure time according to the first embodiment of the present invention.
Figure 8:
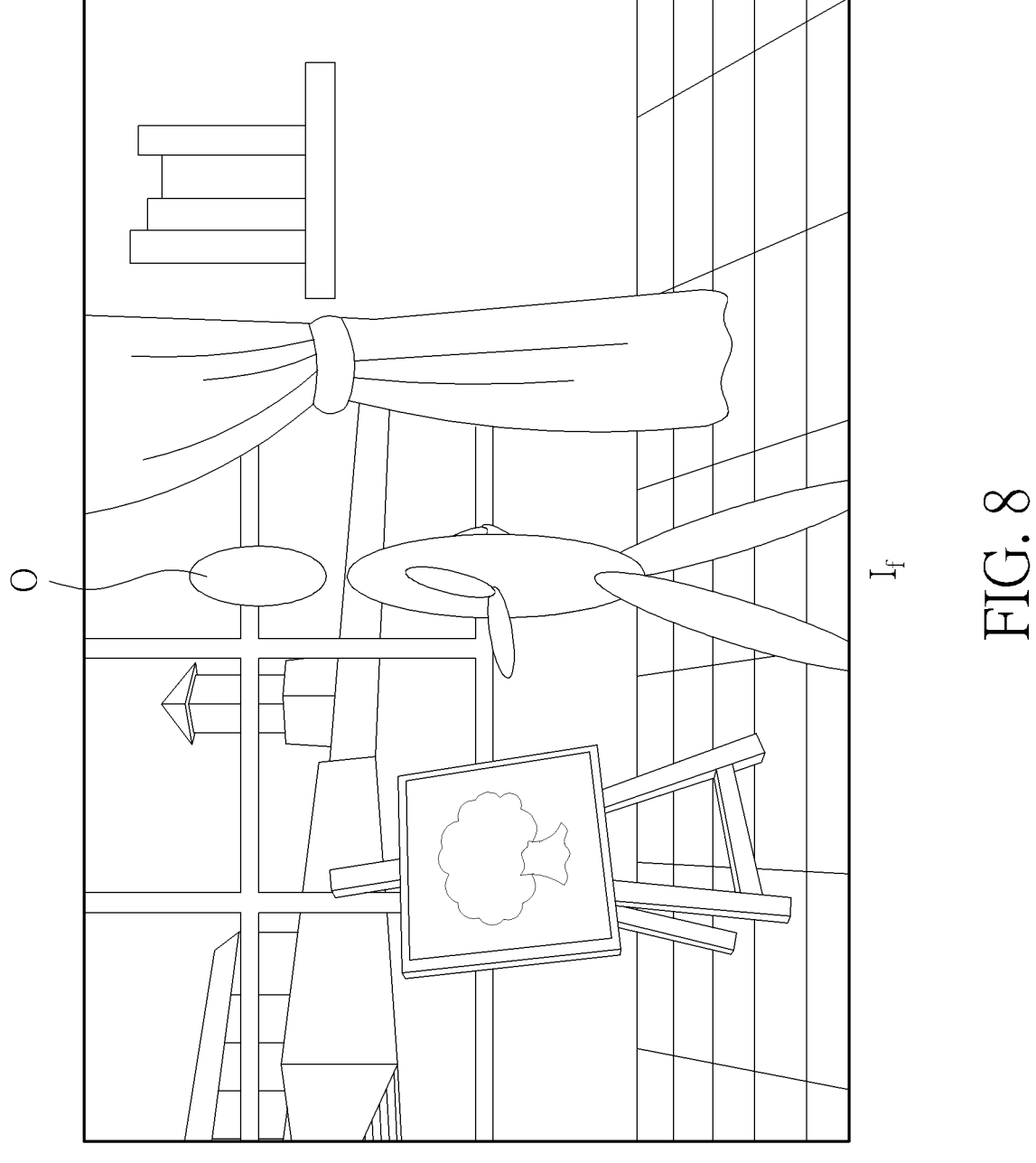
FIG. 8 is a diagram of a fusion image generated by the images having different exposure times according to the first embodiment of the present invention.

Please refer to FIG. 2 to FIG. 8. FIG. 2 is a functional diagram of the image calibration device 10 and the related image capturing apparatus 16 according to a first embodiment of the present invention. FIG. 3 to FIG. 5 are diagrams of difference in the exposure times of the multiple images according to different embodiments of the present invention. FIG. 6 is a diagram of an image I1 having a long exposure time according to the first embodiment of the present invention. FIG. 7 is a diagram of an image I2 having a short exposure time according to the first embodiment of the present invention. FIG. 8 is a diagram of a fusion image Ir generated by the images having different exposure times according to the first embodiment of the present invention.

In the first embodiment, the image capturing apparatus 16 can have two cameras disposed adjacent to each other, such as a first camera 18 and a second camera 20. The first camera 18 and the second camera 20 can have different view angles, and face toward the same surveillance region of the image capturing apparatus 16. The image receiver 12 can be communicated with the image capturing apparatus 16 to receive a first image I1 captured by the first camera 18 and a second image I2 captured by the second camera 20. The first image I1 and the second image I2 can be captured by different exposure times due to the control command of the operation processor 14 or a predefined command from a processor of the image capturing apparatus 16.

The first exposure time of the first image I1 that is completely overlapped or partly overlapped with the second exposure time of the second image I2 can have several embodiments. In the embodiment shown in FIG. 3, a first starting point of time Ts1 of the first exposure time can the same as or close to a second starting point of time Ts2 of the second exposure time. In the embodiment shown in FIG. 4, a first ending point of time Te1 of the first exposure time can be the same as or close to a second ending point of time Te2 of the second exposure time. In the embodiment shown in FIG. 5, the second exposure time can be set between the first starting point of time Ts1 and the first ending point of time Te1 of the first exposure time, which means the second starting point of time Ts2 is later than the first starting point of time Ts1 and the second ending point of time Te2 is earlier than the first ending point of time Te1.

For achieving above-mentioned embodiments, the image calibration device 10 can optionally include a timer 22 electrically connected to the operation processor 14, and the operation processor 14 can control the starting point of time and/or the ending point of time of the first exposure time of the first image I1 and the second exposure time of the second image I2. The image calibration device 10 may utilize other units to set different exposure times of the multiple images I1 and I2, which depends on the design demand, and a detailed description is omitted herein for simplicity.

The first camera 18 can capture the first image I1 having a first exposure time, such as the long exposure time, so that a dark region within the first image I1 can have clear details; for example, an area A1 of the first image I1 relevant to an easel on the floor is back to the window and has clear details of the dark region, and another area A2 of the first image I1 relevant to the window is overexposed. The second camera 20 can capture the second image I2 having a second exposure time, such as the short exposure time, and the second exposure time is different from and at least partly overlapped with the first exposure time; therefore, an area A3 of the second image I2 relevant to the easel is underexposed, and an area A4 of the second image I2 relevant to the window has clear details of a bright region. Other area Ae1 of the first image I1 excluding the area A1 and the area A2, and other area Ae2 of the second image I2 excluding the area A3 and the area A4 are in normal exposure and have clear information.

In addition, because the first exposure time and the second exposure time are at least partly overlapped, variation of the moving object O1 within the first image I1 can be the same as or similar to variation of the moving object O2 within the second image I2. The operation processor 14 can receive the first image I1 and the second image I2 via the image receiver 12, and then align and calibrate the first image I1 and the second image I2 into the same view angle via local alignment, so as to fuse the dark region (such as the area A1) of the first image I1 and the bright region (such as the area A4) of the second image I2 after the local alignment to generate the fusion image I$_f$. As shown in FIG. 8, the fusion image I$_f$ can have the clear details in the areas relevant to the easel and the window, and does not have the motion artifacts due to the same or similar variation in the moving object O1 and the moving object O2.

In the present invention, the first exposure time can be greater than the second exposure time, so that the dark region (such as the area A1) of the first image I1 can be extracted to set as a first feature, and the bright region (such as the area A4) of the second image I2 can be extracted to set as a second feature. The image calibration device 10 can fuse the first feature of the first image I1 and the second feature of the second image I2 with the area Ae1 or Ae2 (or with an average or other computed result of the areas Ae1 and Ae2) to generate the fusion image I$_f$. The patterns on the easel, the scene outside the window, and the moving object O within the fusion image I$_f$ can show the clear details and without the motion artifacts.

In an example of the first image I1, the image calibration device 10 can acquire and compare a pixel value of each pixel of the first image I1 with a predefined threshold. If the said pixel value conforms to the predefined threshold, which means the said pixel value may be greater than or equal to the predefined threshold, the image calibration device 10 can determine the compared pixel is overexposed and belongs to the bright region (such as the area A2); other pixels that do not conform to the predefined threshold can be in the normal exposure and belong to the area A1 or Ae1 of the first image I1. In other possible embodiment, the image calibration device 10 may compare an average pixel value of the plurality of pixels of the first image I1 with the predefined threshold, for determining whether the plurality of pixels belongs to the bright region (such as the area A2) or other regions (such as the areas A1 and Ae1) of the first image I1. The dark region (such as the area A3) and other regions (such as the areas A4 and Ae2) of the second image I2 can be analyzed in a manner the same as the above-mentioned manner applied for the first image I1, and a detailed description is omitted herein for simplicity.

Figure 9:
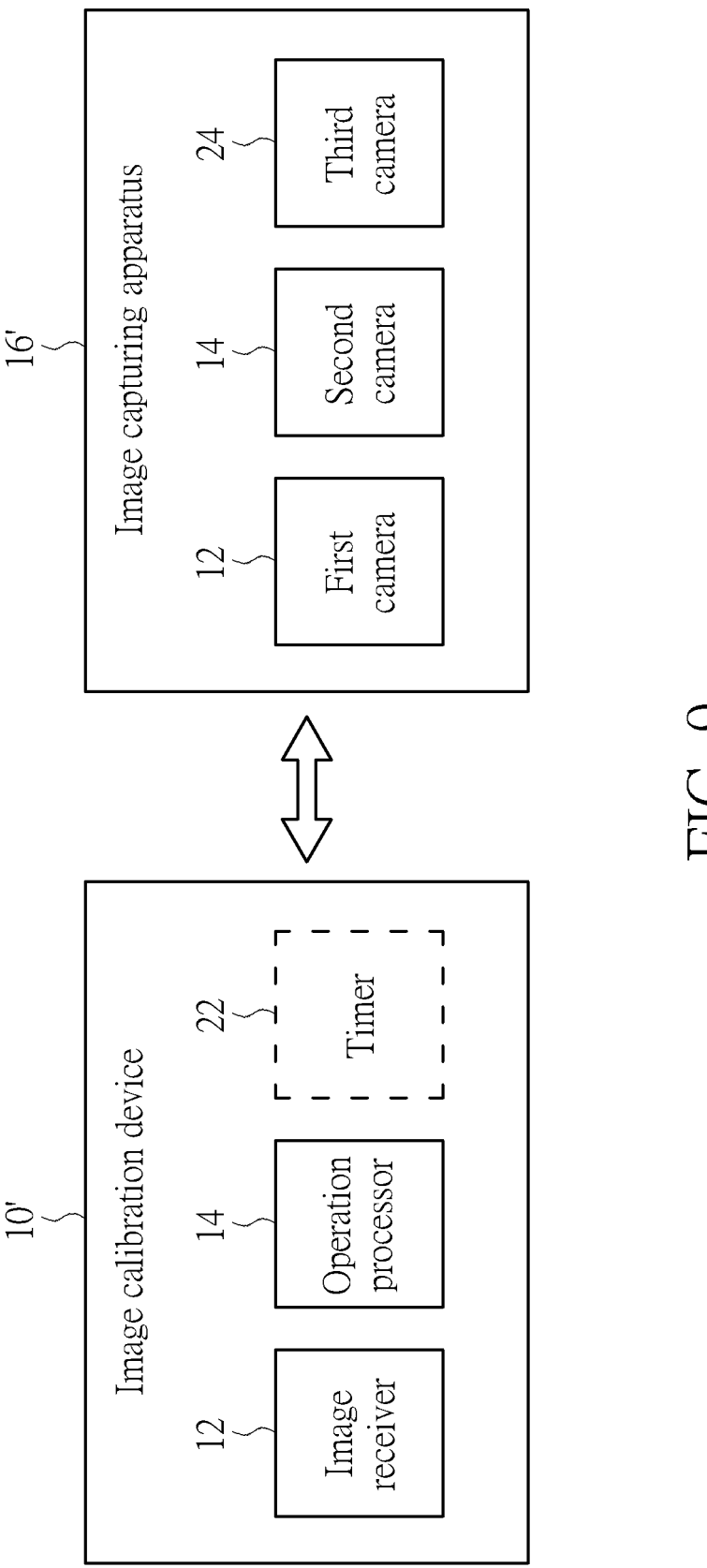
FIG. 9 is a functional diagram of the image calibration device and the related image capturing apparatus according to a second embodiment of the present invention.

Please refer to FIG. 9. FIG. 9 is a functional diagram of the image calibration device 10' and the related image capturing apparatus 16' according to a second embodiment of the present invention. In the second embodiment, elements having the same numerals as ones of the first embodiment have the same structures and functions, and a detailed description is omitted herein for simplicity. The image capturing apparatus 16' can have the first camera 18, the second camera 20 and a third camera 24. The image calibration device 10' can output the control command for driving the third camera 24 to capture a third image having a third exposure time different from and at least partly overlapped with the first exposure time of the first image I1 and the second exposure time of the second image I2.

The third exposure time may be shorter than the first exposure time and the second exposure time, or may be shorter than the first exposure time but greater than the second exposure time, which depends on the design demand. According to difference in the first exposure time, the second exposure time and the third exposure time, a third feature (which may be a dark region or a bright region, or a middle region having intensity between ones of the dark region and the bright region) of the third image can be extracted to fuse with the first feature of the first image I1 and the second feature of the second image I2 for generating the fusion image I$_f$.

The multispectral camera technology in the present invention can cover various camera types, such as the RGB camera/sensor, the near-infrared (NIR) camera/sensor, the RGB-IR camera/sensor, the RGB-W camera/sensor, and the monochrome camera/sensor. The first camera 18, the second camera 20 and the third camera 24 of the image calibration device 10 can use any combinations selected from above-mentioned camera types (either the same or different camera types) in accordance with the following Table 1, so as to provide different advantages of the fusion result. Table 1 illustrates several sets of one possible embodiment having the first camera 18 and the second camera 20. For example, the NIR camera has high sensitivity and performs preferred image quality under a low light condition, and therefore the first camera 18 that has the first exposure time (the long exposure time) can be the RGB camera for more color information, and the second camera 20 that has the second exposure time (the short exposure time) can be the NIR camera for more details.

starting point of time, or be captured at the same ending point of time, or have the completely or partly overlapped exposure times, the multiple frame-sync and viewpoint-align images can be fused into the single HDR image without the motion artifacts.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image calibration method of providing a motion deblur function, comprising:
   driving a first camera to capture a first image having a first exposure time;
   extracting a dark region of the first image to set as a first feature;
   driving a second camera disposed adjacent to the first camera to capture a second image having a second exposure time different from and at least partly over-

TABLE 1

|  | Set 1 | Set 2 | Set 3 | Set 4 | Set 5 | Set 6 |
|---|---|---|---|---|---|---|
| First camera 18 | RGB sensor | NIR sensor | Monochrome sensor | NIR sensor | Monochrome sensor | Monochrome sensor |
| Second camera 20 | RGB sensor | NIR sensor | Monochrome sensor | RGB sensor | RGB sensor | NIR sensor |

Figure 10:
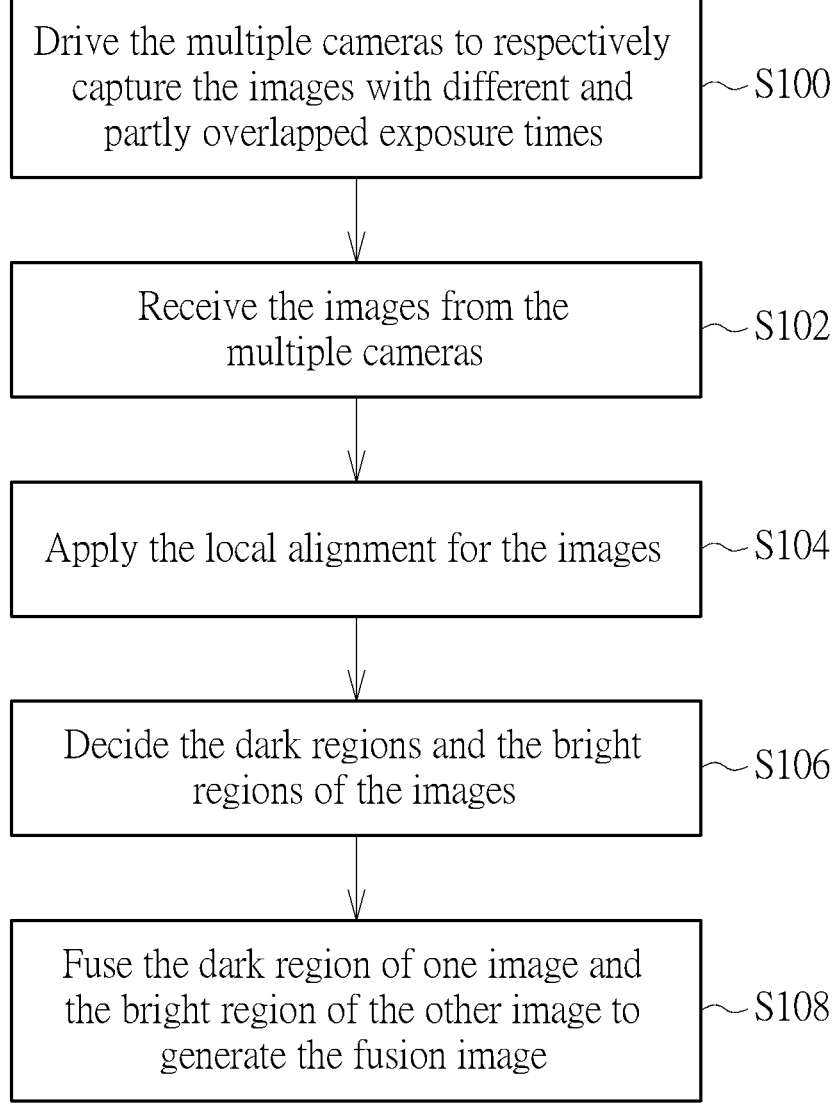
FIG. 10 is a flow chart of an image calibration method according to the embodiment of the present invention.

Please refer to FIG. 6 to FIG. 8 and FIG. 10. FIG. 10 is a flow chart of an image calibration method according to the embodiment of the present invention. The image calibration method illustrated in FIG. 10 can be applied for the image calibration device 10 shown in FIG. 2. First, step S100 can be optionally executed that the image calibration device 10 may output the control command to actuate or drive the first camera 18 and the second camera 20 to respectively capture the first image I1 and the second image I2. The first image I1 can have the first exposure time greater than the second exposure time of the second image I2. The first exposure time and the second exposure time can be completely or partly overlapped, such as the embodiments shown in FIG. 3 to FIG. 5.

Then, step S102 and step S104 can be executed that the image calibration device 10 can receive the first image I1 and the second image I2 respectively from the first camera 18 and the second camera 20, and apply the local alignment for the first image and the second image to align these images into the same view angle. Later, step S106 can be executed that the image calibration device 10 can analyze all pixels within the first image I1 and the second image I2 to determine whether the pixel or the plural pixels gathered around conforms to the predefined threshold, so as to decide the dark regions and the bright regions of the first image I1 and the second image I2. Final, step S108 can be executed that the image calibration device 10 can fusing the first feature (such as the dark region) of the first image I1 and the second feature (such as the bright region) of the second image I2 to generate the fusion image I$_f$.

In conclusion, the image calibration method and the image calibration device can utilize the multiple cameras to capture the image with frame synchronized and the at least partly overlapped exposure times; because the images captured by different cameras can be captured at the same lapped with the first exposure time, wherein the first exposure time is greater than the second exposure time;
   extracting a bright region of the second image to set as a second feature; and
   fusing the first feature of the first image and the second feature of the second image to generate a fusion image;
   wherein the first camera and the second camera are disposed adjacent to each other and face toward the same region;
   wherein the first camera comprises a Near-Infrared (NIR) sensor or a Monochrome sensor while the second camera comprises a RGB sensor; or the first camera comprises a Monochrome sensor while the second camera comprises a Near-Infrared (NIR) sensor.

2. The image calibration method of claim 1, further comprising:
   driving the first camera to capture the first image at a starting point of time; and
   driving the second camera to capture the second image at the starting point of time.

3. The image calibration method of claim 1, further comprising:
   driving the first camera to finish capturing of the first image at an ending point of time; and
   driving the second camera to finish capturing of the second image at the ending point of time.

4. The image calibration method of claim 1, further comprising:
   driving the first camera to execute capturing of the first image from a starting point of time to an ending point of time; and
   driving the second camera to execute capturing of the second image between the starting point of time and the ending point of time.

5. The image calibration method of claim 1, further comprising:

driving a third camera to capture a third image having a third exposure time different from and at least partly overlapped with the first exposure time and the second exposure time; and fusing a third feature of the third image with the first feature of the first image and the second feature of the second image to generate the fusion image.

6. The image calibration method of claim 1, further comprising:

utilizing a timer to drive the first camera and the second camera to respectively capture the first image having the first exposure time and the second image having the second exposure time.

7. The image calibration method of claim 1, further comprising:

executing local alignment for the first image and the second image so as to fuse the first image and the second image after the local alignment for generating the fusion image.

8. The image calibration method of claim 1, wherein the image calibration method determines at least one pixel of the first image belongs to the dark region when a pixel value of the at least one pixel conforms to a predefined threshold.

9. The image calibration method of claim 1, wherein the image calibration method determines a plurality of pixels of the first image belongs to the dark region when an average pixel value of the plurality of pixels conforms to a predefined threshold.

10. An image calibration device, comprising:

an image receiver adapted to receive a first image captured by a first camera and a second image captured by a second camera; and an operation processor electrically connected to the image receiver, the operation processor outputting a control command for extracting a dark region of the first image to set as a first feature, driving the first camera to capture the first image having a first exposure time and driving the second camera to capture the second image having a second exposure time different from and at least partly overlapped with the first exposure time, extracting a bright region of the second image to set as a second feature, and further receiving the first image and the second image via the image receiver so as to fuse the first feature of the first image and the second feature of the second image to generate a fusion image;

wherein the first exposure time is greater than the second exposure time;

wherein the first camera and the second camera are disposed adjacent to each other and face toward the same region;

wherein the first camera comprises a Near-Infrared (NIR) sensor or a Monochrome sensor while the second camera comprises a RGB sensor; or the first camera comprises a Monochrome sensor while the second camera comprises a Near-Infrared (NIR) sensor.

11. The image calibration device of claim 10, wherein the image calibration device further comprises a timer electrically connected to the operation processor, the operation processor utilizes the timer to drive the first camera and the second camera to respectively capture the first image having the first exposure time and the second image having the second exposure time.

12. The image calibration device of claim 10, wherein the operation processor executes local alignment for the first image and the second image, and fuses the first image and the second image after the local alignment to generate the fusion image.

* * * * *